J. Higgins,
Making Spinners' Rings,
N° 59,523. Patented Nov. 6, 1866.
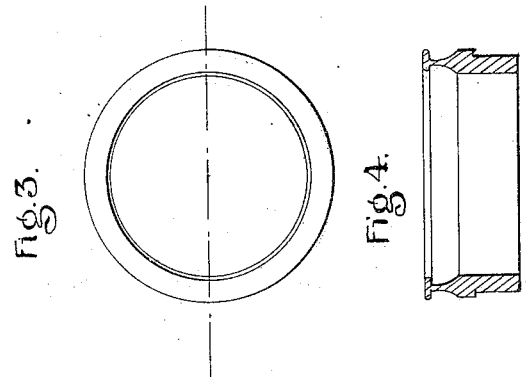
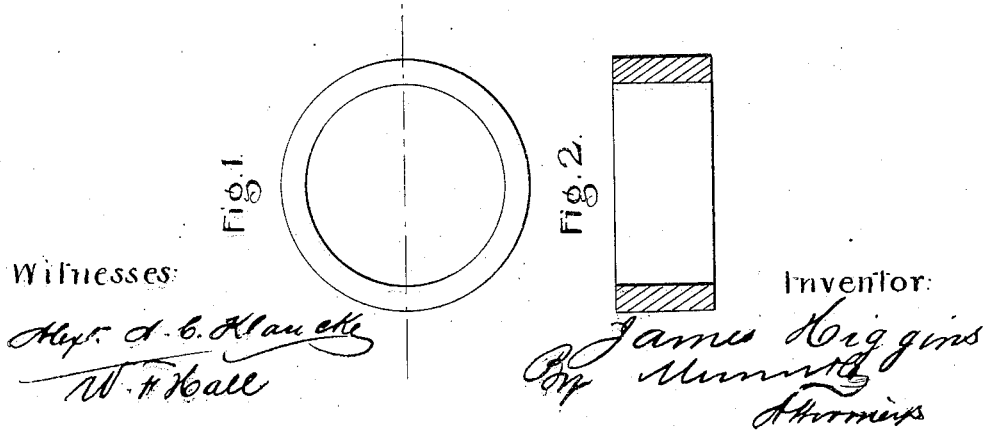
Witnesses:
Inventor:

UNITED STATES PATENT OFFICE.

JAMES HIGGINS, OF MANCHESTER, GREAT BRITAIN.

IMPROVEMENT IN RINGS FOR RING-AND-TRAVELER SPINNING-MACHINES.

Specification forming part of Letters Patent No. 59,523, dated November 6, 1866.

*To all whom it may concern:*

Be it known that I, JAMES HIGGINS, of Manchester, in the county of Lancaster, Great Britain, have invented Improvements in the Manufacture of Rings for the Ring-and-Traveler System of Spinning; and I do hereby declare that the following is a full and exact description thereof.

My invention refers to a method of manufacturing rings for the ring-and-traveler system of spinning, whereby I am enabled to produce them in steel or iron without a welded joint. To accomplish this I take a tube of steel or iron, which tube may be drawn as is now practiced; or the said tube may be manufactured by any other known method, so long as it is produced without a welded joint. This tube I cut into lengths corresponding to the depth of the ring to be formed, and produce the usual beading or beveling by turning and boring. Instead of commencing with a tube, I produce the same effect by taking a rod of the metal, from which I sever suitable lengths, as above mentioned. Through these lengths I drill or otherwise form a hole, which may be of small diameter compared to the intended internal diameter of the ring.

The above-mentioned hole I enlarge by swaging or otherwise forcing the metal outward until the ring is expanded to the full diameter, and so much more as is necessary for the turning or boring operation above mentioned.

I claim, and desire to secure by Letters Patent, as a new article of manufacture—

The seamless ring herein described for ring-and-traveler spinning, cut from a tube or rod, and finished by swaging or turning, all as specified.

JAMES HIGGINS.

Witnesses:
THEO. J. IRWIN,
R. F. BROWN.